(12) United States Patent
Kang et al.

(10) Patent No.: US 12,225,035 B2
(45) Date of Patent: *Feb. 11, 2025

(54) SYSTEMS, METHODS, AND MEDIA FOR DEFENDING COMPUTING SYSTEMS FROM ATTACK

(71) Applicant: The Trustees of Columbia University in the City of New York, New York, NY (US)

(72) Inventors: Yuan Jochen Kang, New York, NY (US); Salvatore Stolfo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,002

(22) Filed: Oct. 9, 2023

(65) Prior Publication Data

US 2024/0039941 A1 Feb. 1, 2024

Related U.S. Application Data

(63) Continuation of application No. 17/698,751, filed on Mar. 18, 2022, now Pat. No. 11,831,418, which is a
(Continued)

(51) Int. Cl.
*G06F 7/58* (2006.01)
*G06F 9/54* (2006.01)
(Continued)

(52) U.S. Cl.
CPC .......... *H04L 63/1425* (2013.01); *G06F 7/582* (2013.01); *G06F 9/542* (2013.01);
(Continued)

(58) Field of Classification Search
USPC .......................................................... 726/23
See application file for complete search history.

(56) References Cited

U.S. PATENT DOCUMENTS

| H1814 H | * | 11/1999 | Browning | ............... G06F 8/656 |
| | | | | 379/242 |
| 7,624,448 B2 | | 11/2009 | Coffman | |
| (Continued) | | | | |

OTHER PUBLICATIONS

Al-Riyami et al ("An Adaptive Early Node Compromise Detection Scheme for Hierarchical WSNs"), IEEE Access, Digital Object Identifier 10.1109/ACCESS.2016.2594478, Aug. 3, 2016, pp. 4183-4206 (Year: 2016).*

(Continued)

*Primary Examiner* — Sakinah White Taylor
(74) *Attorney, Agent, or Firm* — Byrne Poh LLP

(57) ABSTRACT

Mechanisms for defending a computing system from attack are provided. The mechanisms include: maintaining a round counter that tracks a round number for a local host; determining a location in a graph for each of a plurality of hosts including the local host; determining monitor hosts of the plurality of hosts that are monitoring the local host; determining monitoree hosts of the plurality of hosts that are being monitored by the local host; sending a message to each of the monitor hosts identifying a value of the round counter; forwarding a first set of heartbeat messages from previous monitoree hosts to the monitor hosts; attempting to receive messages from the monitoree hosts; determining whether any messages were not received from the monitoree hosts; and in response to determining that one or more messages were not received from the monitoree hosts, generating an alert.

20 Claims, 4 Drawing Sheets

Related U.S. Application Data continuation of application No. 16/365,268, filed on Mar. 26, 2019, now Pat. No. 11,310,249.

(60) Provisional application No. 62/648,290, filed on Mar. 26, 2018.

(51) Int. Cl.
    *G06F 21/54*     (2013.01)
    *G06F 21/60*     (2013.01)
    *H04L 9/40*     (2022.01)

(52) U.S. Cl.
    CPC ............ *G06F 21/54* (2013.01); *G06F 21/602* (2013.01); *H04L 63/1416* (2013.01)

(56) References Cited

U.S. PATENT DOCUMENTS

| | | |
|---|---|---|
| 7,949,785 B2 | 5/2011 | Alkhatib et al. |
| 8,627,473 B2 | 1/2014 | Coskun |
| 9,231,936 B1* | 1/2016 | Wang ...................... H04L 63/12 |
| 9,495,544 B2* | 11/2016 | Aissi ..................... H04L 9/3278 |
| 9,876,808 B2 | 1/2018 | Lim et al. |
| 9,886,581 B2 | 2/2018 | Olson et al. |
| 9,928,366 B2 | 3/2018 | Ladnai et al. |
| 10,168,697 B2 | 1/2019 | Hernandez Sanchez et al. |
| 10,609,005 B2* | 3/2020 | Iizuka ................... H04L 9/0643 |
| 11,025,483 B1 | 6/2021 | Hashmi |
| 11,556,658 B2* | 1/2023 | Schvey ................... G06F 3/062 |
| 2009/0293122 A1 | 11/2009 | Abdel-Aziz |
| 2013/0305357 A1 | 11/2013 | Ayyagari et al. |
| 2014/0136414 A1 | 5/2014 | Abhyanker |
| 2015/0341422 A1 | 11/2015 | Farnlof |
| 2016/0156611 A1 | 6/2016 | Rozman |
| 2018/0032724 A1 | 2/2018 | Tang et al. |
| 2018/0077174 A1 | 3/2018 | Herbert |
| 2018/0089014 A1 | 3/2018 | Smith |
| 2018/0183827 A1 | 6/2018 | Zorlular et al. |
| 2024/0305654 A1* | 9/2024 | Diehl .................. H04L 63/1416 |

OTHER PUBLICATIONS

Dutta et al ("Asynchronous Neighbor Discovery: Finding Needles of Connectivity in Haystacks of Time"), IEEE, 2008 International Conference on Information Processing in Sensor Networks (ipsn 2008), Apr. 22-24, 2008, pp. 531-532 (Year: 2008).*

Liang et al ("Collision Resolution Algorithm-Based Heartbeat Radio Access"), 2010 IEEE Aerospace Conference, The Aerospace Corporation, IEEE Xplore, pp. 1-6 (Year: 2010).*

Fraigniaud et al ("D2B: A de Bruijn based content—addressable network"), Science Direct, Theoretical Computer Science 355 (2006), pp. 65-79 (Year: 2006).*

Chang, H., and Atallah, M.J., "Protecting Software Code by Guards", In Digital Rights Management Workshop, May 7, 2002, pp. 160-175.

Chinchani, R., et al., "A Tamper-Resistant Framework for Unambiguous Detection of Attacks in User Space Using Process Monitors", In the Proceedings of the First IEEE International Workshop on Information Assurance, Darmstadt, Germany, Mar. 24, 2003, pp. 1-10.

Cluley, G., "DarkSeoul: SophosLabs identifies malware used in South Korean internet attack", Naked Security by Sophos, Mar. 20, 2013, available at: https://nakedsecurity.sophos.com/2013/03/20/south-korea-cyber-attack, pp. 1-15.

Coppolino, L. et al., "A Trusted Information Agent for Security Information and Event Management", In ICONS 2012, The Seventh International Conference on Systems, Feb. 29-Mar. 5, 2012 Saint Gilles, Reunion Island, pp. 6-12.

Ernst, J., et al., "A Survey and Comparison of Performance Evaluation in Intrusion Detection Systems", In Computer and Network Security Essentials, Aug. 2017, pp. 555-568.

Gupta, I., et al., "On Scalable and Efficient Distributed Failure Detectors", In Proceedings of the Twentieth Annual ACM Symposium on Principles of Distributed Computing, Aug. 1, 2001, pp. 170-179.

Jabez, J., et al., "Intrusion Detection System (IDS): Anomaly Detection Using Outlier Detection Approach", In Procedia Computer Science, Jun. 2015, pp. 338-346.

Janakiraman, R., et al., "Indra: a peer-to-peer approach to network intrusion detection and prevention", In the Proceedings of the Twelfth IEEE International Workshops on Enabling Technologies: Infrastructure for Collaborative Enterprises, Jun. 11, 2003, Linz, Austria, pp. 1-6.

Kaashoek, M., et al., "Koorde: A Simple Degree-Optimal Distributed Hash Table", In Proceedings of Internation Workshop on Peer-to-Peer Systems, Lecture Notes in Computer Science, vol. 2735, Feb. 21-22, 2003, pp. 98-107.

Karspersky Lab, "How to Enable/Disable Self-Defense of Kaspersky Internet Security 2012", Aug. 15, 2012, available at http://support.kaspersky.com/6259, pp. 1-6.

Kaufman, D., "An Analytical Framework for Cyber Security" Technical Report, Nov. 2011, pp. 1-24.

Malkhi, D., et al., "Unreliable Intrusion Detection in Distributed Computations", In Proceedings 10th Computer Security Foundations Workshop, Jun. 10-12, 1997, Rockport, MA, US, pp. 116-124.

Mohamed, N., et al., "A Fault Tolerant Wired/Wireless Sensor Network Architecture for Monitoring Pipeline Infrastructures", In 2008 Second International Conference on Sensor Technologies and Applications, Aug. 25-31, 2008, Cap Esterel, France, pp. 179-184.

Notice of Allowance dated Jul. 20, 2023 in U.S. Appl. No. 17/698,751, pp. 1-56.

Notice of Allowance dated Dec. 22, 2021 in U.S. Appl. No. 16/365,268, pp. 1-19.

NS-3, "ns-3 Network Simulator," Jun. 2014, available at: https://nsnam.org, pp. 1-121.

Office Action dated Mar. 23, 2023 in U.S. Appl. No. 17/698,751, pp. 1-237.

Office Action dated Jun. 25, 2021 in U.S. Appl. No. 16/365,268, pp. 1-15.

Paxson, V., "Bro: A system for detecting network intruders in real-time," USENIX Security Symposium, San Antonio, Texas, US, Jan. 26-29, 1998, pp. 1-22.

Perlroth, N., et al., "How Israel Caught Russian Hackers Scouring the World for U.S. Secrets", In The New York Times, Oct. 10, 2017, available at:https://www.nytimes.com/2017/10/10/technology/kaspersky-lab-israel-russia-hacking.html, pp. 1-5.

Plummer, D. W., et al., "The History of Nuclear Weapon Safety Devices", Sandia National Laboratories. Jun. 8, 1998, pp. 1-8.

Skywing, "Patchguard Reloaded: A Brief Analysis of Patchguard Version 3", Sep. 2007, available at www.uninformed.org/?v=8&a=5&t=txt, pp. 1-2.

Spray, S. and Cooper, A., "The Unique Signal Concept for Detonation Safety in Nuclear Devices", Technical Report UC-706, Sandia National Laboratories, Dec. 1992, pp. 1-73.

Stolfo, S.J., et al., "Self-Monitoring Monitors", Technical Report, CUCS-026-09, Columbia University Computer Science Department, Apr. 2009, pp. 1-11.

Sun, Q., "Improving the Performance of Peer-to-Peer Systems", Technical Report, Dissertation, Stanford University, Sep. 2009, pp. 1-201.

Symantec Corporation, "Symantec Endpoint Protection 11.0: Configuring the sep client for self-protection", available at http://www.symantec.com/connect/sites/default/files/SEP_Protecting_SEP_Client_rev1.0.pdf, 2011, last accessed Dec. 10, 2021, pp. 1-8.

Yang, Y., et al., "Distributed Software-based Attestation for Node Compromise Detection in Sensor Networks", In 2007 26th IEEE International Symposium on Reliable Distributed Systems, Oct. 10-12, 2007, Beijing, China, pp. 219-230.

Yi, S., et al., "Research of Network Intrusion-Detection System Based on Data Mining", In Recent Progress in Data Engineering and Internet Technology, Apr. 2012, pp. 141-148.

Yuan, F., et al., "Research Intrusion Detection System on Android", In the Proceedings of the IEEE Ninth World Congress on Services, Santa Clara, CA, US, Jun. 28-Jul. 3, 2013, pp. 312-316.

(56) References Cited

OTHER PUBLICATIONS

Zhou, C., et al., "A Survey of Coordinated Attacks and Collaborative Intrusion Detection", In Computers and Security, vol. 29, No. 1, Feb. 2010, pp. 124-140.

* cited by examiner

SYSTEMS, METHODS, AND MEDIA FOR DEFENDING COMPUTING SYSTEMS FROM ATTACK

CROSS REFERENCE TO RELATED APPLICATION

This application is a continuation of U.S. patent application Ser. No. 17/698,751, filed Mar. 18, 2022, which is a continuation of U.S. patent application Ser. No. 16/365,268, filed Mar. 26, 2019, now U.S. Pat. No. 11,310,249, which claims the benefit of U.S. Provisional Patent Application No. 62/648,290, filed Mar. 26, 2018, each of which is hereby incorporated by reference herein in its entirety.

STATEMENT REGARDING GOVERNMENT FUNDED RESEARCH

This invention was made with government support under FA9550-12-1-0162 awarded by the United States Air Force/Air Force Office of Scientific Research and N00014-17-1-2010 awarded by the Office of Naval Research. The government has certain rights in the invention.

BACKGROUND

Given the near impossibility of removing all vulnerabilities from computing systems, intrusion detection systems are a vital line of defense. However, these systems themselves can also have vulnerabilities. An attacker could exploit those vulnerabilities to leave the defended system exposed, or even turn the privileges of the defense against the resources that it was supposed to protect. Therefore, intrusion detection systems themselves also need to be defended.

Accordingly, new mechanisms for defending computing systems from attack are desirable.

SUMMARY

In accordance with some embodiments, systems, methods, and media for defending computing systems from attack are provided. In some embodiments, systems for defending computing systems from attack are provided, the systems comprising: a memory; and a hardware processor coupled to the memory and configured to execute a local host that is configured to: maintain a round counter that tracks a round number; determine a location in a graph for each of a plurality of hosts including the local host; determine monitor hosts of the plurality of hosts that are monitoring the local host; determine monitoree hosts of the plurality of hosts that are being monitored by the local host; send a message to each of the monitor hosts identifying a value of the round counter; forward a first set of heartbeat messages from previous monitoree hosts to the monitor hosts; attempt to receive messages from the monitoree hosts; determine whether any messages were not received from the monitoree hosts; and in response to determining that one or more messages were not received from the monitoree hosts, generate an alert.

In some embodiments, methods for defending a computing system from attack are provided, the methods comprising: maintaining a round counter that tracks a round number for a local host using a hardware processor; determining a location in a graph for each of a plurality of hosts including the local host using the hardware processor; determining monitor hosts of the plurality of hosts that are monitoring the local host using the hardware processor; determining monitoree hosts of the plurality of hosts that are being monitored by the local host using the hardware processor; sending a message to each of the monitor hosts identifying a value of the round counter using the hardware processor; forwarding a first set of heartbeat messages from previous monitoree hosts to the monitor hosts using the hardware processor; attempting to receive messages from the monitoree hosts using the hardware processor; determining whether any messages were not received from the monitoree hosts using the hardware processor; and in response to determining that one or more messages were not received from the monitoree hosts, generating an alert using the hardware processor.

In some embodiments, non-transitory computer-readable media containing computer-executable instructions that, when executed by a processor, cause the processor to perform a method for defending a computing system from attack are provided, the method comprising: maintaining a round counter that tracks a round number for a local host; determining a location in a graph for each of a plurality of hosts including the local host; determining monitor hosts of the plurality of hosts that are monitoring the local host; determining monitoree hosts of the plurality of hosts that are being monitored by the local host; sending a message to each of the monitor hosts identifying a value of the round counter; forwarding a first set of heartbeat messages from previous monitoree hosts to the monitor hosts; attempting to receive messages from the monitoree hosts; determining whether any messages were not received from the monitoree hosts; and in response to determining that one or more messages were not received from the monitoree hosts, generating an alert.

DETAILED DESCRIPTION

Mechanisms (including systems, methods, and media) for defending computing systems from attack are provided. In some embodiments, these mechanisms operate by assigning each of a plurality of hosts to a vertex in a directed graph. The hosts can be any suitable device, virtual machine, application, process, etc. that operates to detect and alert others to an attack on any of the hosts (i.e., to act as an IDS), thereby allowing countermeasures to respond to the attack in some embodiments. In some embodiments, a host can launch one or more child applications that the host can monitor to determine if the child application(s) stop. The directed graph defines monitoring relationships among the hosts. For example, if a vertex in the graph has an edge that points from the vertex to another vertex, the vertex is to monitor the other vertex. As another example, if a vertex in the graph has an edge that points to the vertex from another vertex, the vertex is to be monitored by the other vertex.

During operation, each host can track a round (or interval) during which certain messages are to be exchanged by the hosts. For example, each host can send a signed message with its round number to hosts that are monitoring the host. As another example, each host can send a heartbeat message to the hosts that are monitoring the host. As yet another example, each host can forward heartbeat messages received from hosts that it monitors to the hosts that are monitoring the host. If any host determines that any messages are invalid or missing, the host can generate an alert indicating an attack. This alert can be transmitted to any suitable hosts and/or other devices, applications, processes, etc.

When certain conditions are met, the hosts can update the positions in the graph occupied by each of the hosts. In some embodiments, the conditions can be that a round number is divisible by a diameter of the graph. The positions can be updated based on a pseudo-random function in some embodiments. In some embodiments, this pseudo-random function can use a shared key, the round counter, and identifiers for each of the hosts to determine the locations of the host in the graph. In some embodiments, each of the hosts can independently determine the locations of the host in the graph using the shared key, the round counter, and identifiers for each of the hosts. This way, the locations of the hosts in the graph are only known by the hosts.

Figure 1:
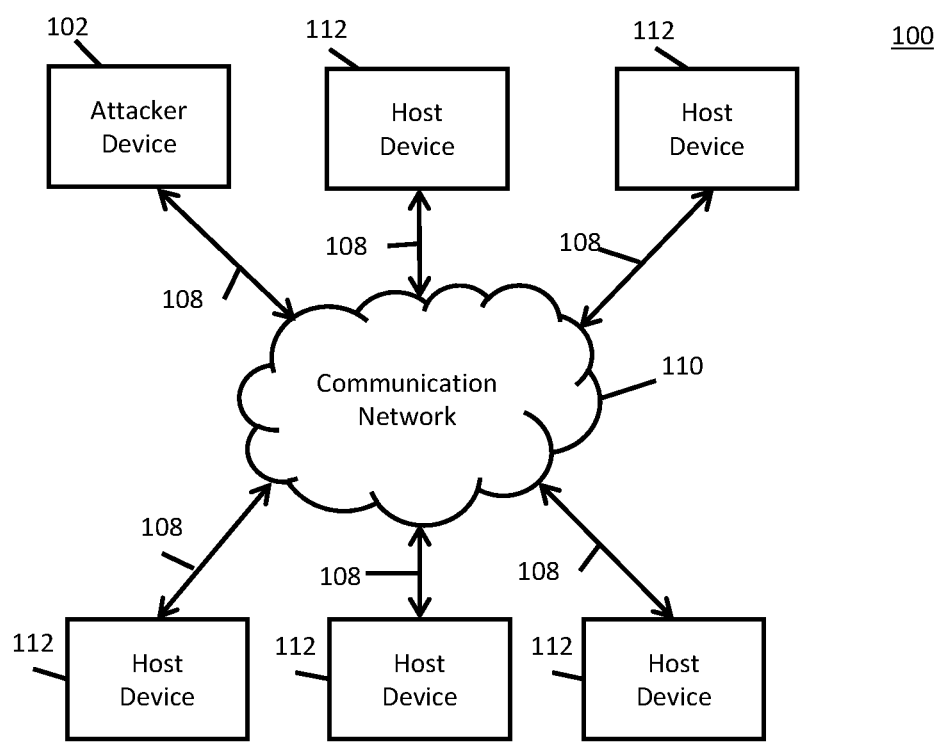
FIG. 1 is a block diagram of an example of a network of components that can be used in accordance with some embodiments.

Turning to FIG. 1, an example of system hardware 100 that can be used in some embodiments is illustrated. As shown, system hardware 100 can include one or more attacker devices 102, a plurality of host devices 112, a communication network 110, communication links 108, and/or any other suitable components.

Hardware 100 can have any suitable scale in some embodiments. For example, in a small-scale implementation, each of the components shown in FIG. 1 can reside inside a user's home. As another example, in a medium-scale implementation, each of the components shown in FIG. 1 can reside inside an enterprise (which can span multiple locations). As yet another example, in a large-scale implementation, the components shown in FIG. 1 can reside anywhere on the Earth.

Attacker devices 102 can be any suitable devices from which to mount an attack on one or more systems protected by host devices 112. Although one attacker device is shown in FIG. 1, it should be apparent that any suitable number of attacker devices can be present. Although an attacker device is shown herein as being part of system 100, it should be apparent that attacker devices are undesirable and that a system implemented in accordance with some embodiments may have no attacker devices. Although an attacker device may be thought of as being inside a network of components as shown, this presence may virtual and the attacker device may actually be outside the network but connected to the network in such a way as to present a threat to one or more components of the network.

Communication network 110 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

In some embodiments, attacker devices 102 and host devices 112 can be connected to communication network 110 through communication links 108. In some embodiments, communication links 108 can be any suitable communication links, such as network links, dial-up links, wireless links, hard-wired links, any other suitable communication links, or a combination of such links.

In some embodiments, communication network 110 and communication links 108 can be omitted when not needed.

Host devices 112 can be any suitable devices, virtual machines, applications, processes, etc. for protecting systems (not shown) from computer intrusions by one or more attacker devices. For example, a host device can be, can be part of, or can be attached to a firewall that is protecting a computer network of a business, a school, a home, a community, or any other suitable thing. As another example, a host device can be, can be part of, or can be attached to an endpoint device, such as a desktop computer, a laptop computer, a tablet computer, a smart phone, a smart appliance, an Internet of Things (IoT) device (e.g., a camera, a smart lock, a smart thermostat, a smart fire alarm, a home automation hub, and/or any other suitable IoT device), a set-top box, a streaming media device, a gaming device, a smart television, and/or any other suitable device that is vulnerable to attack and that has the ability to perform some or all of the functions described herein.

Figure 2:
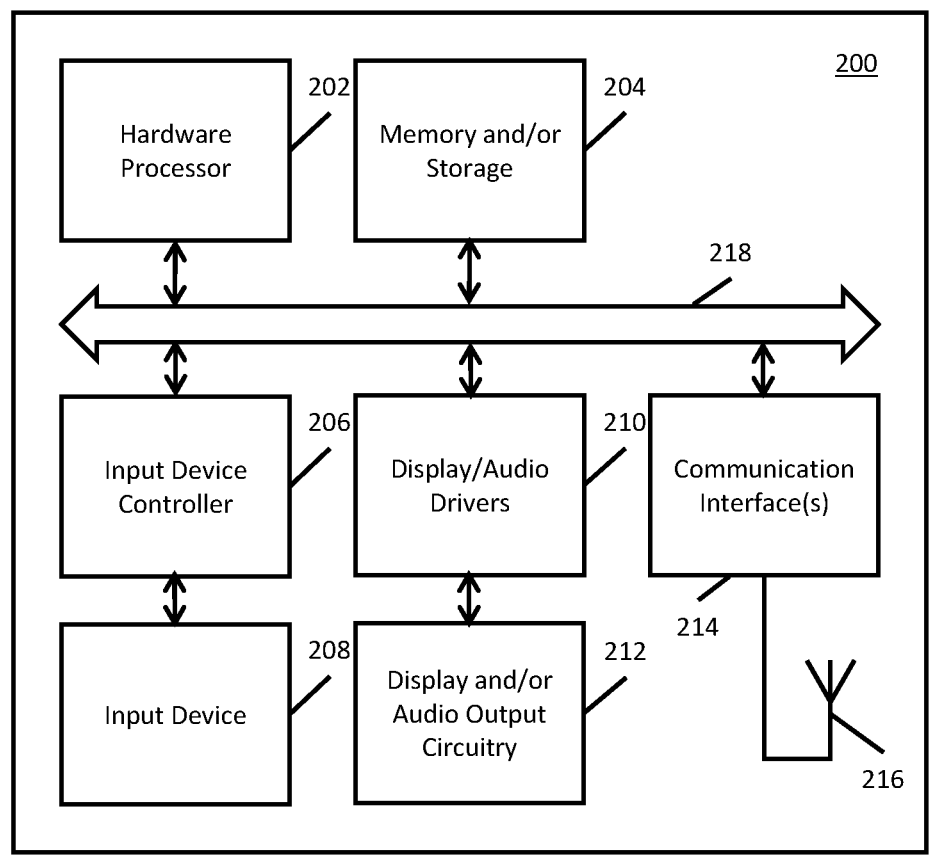
FIG. 2 is a block diagram of an example of more detailed hardware that can be used to implement certain components of FIG. 1 in accordance with some embodiments.

Each of devices 102 and 112 can include and/or be any of a general-purpose device such as a computer or a special-purpose device such as a client, a server, and/or any other suitable device. Any such general-purpose computer or special-purpose computer can include any suitable hardware. For example, as illustrated in example hardware 200 of FIG. 2, such hardware can include a hardware processor 202, memory and/or storage 201, an input device controller 206, an input device 208, display/audio drivers 210, display and/or audio output circuitry 212, communication interface(s) 214, an antenna 216, and a bus 218.

Hardware processor 202 can include any suitable hardware processor, such as a microprocessor, a micro-controller, digital signal processor, dedicated logic, and/or any other suitable circuitry for controlling the functioning of a general-purpose computer or special purpose computer in some embodiments.

Memory and/or storage 204 can be any suitable memory and/or storage for storing programs, data, metrics, and/or any other suitable information in some embodiments. For example, memory and/or storage 204 can include random access memory, read only memory, flash memory, hard disk storage, optical media, and/or any other suitable storage device.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 210 can be any suitable circuitry for controlling and driving output to one or more display and/or audio output circuitries 212 in some embodiments. For example, display/audio drivers 210 can be circuitry for driving an LCD display, a speaker, an LED, and/or any other display/audio device.

Communication interface(s) 214 can be any suitable circuitry for interfacing with one or more communication networks, such as communication network 410 in some embodiments. For example, interface(s) 214 can include network interface card circuitry, wireless communication circuitry, and/or any other suitable circuitry for interfacing with one or more communication networks.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more of components 202, 204, 206, 210, and 214 in some embodiments.

Any other suitable components can be included in hardware 200 in accordance with some embodiments.

Figure 3:
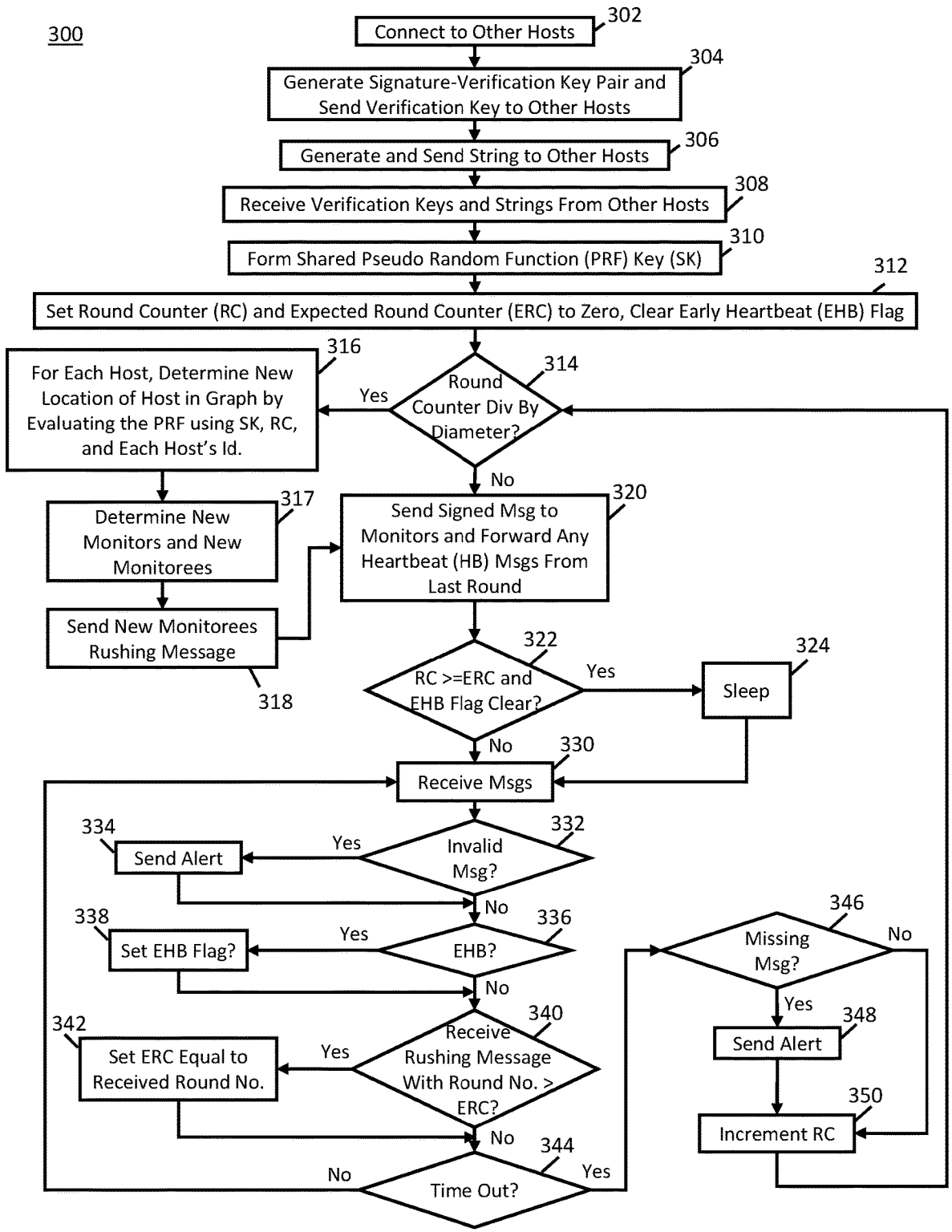
FIG. 3 is a flow diagram of an example of a process for monitoring hosts in accordance with some embodiments.

Turning to FIG. 3, an example 300 of a process for monitoring hosts in accordance with some embodiments is shown. Process 300 can be executed by any suitable device, and any suitable device can execute any suitable number of instances of process 300 in some embodiments. For example, a host device 112 (FIG. 1) can execute an instance of process 300 for each critical application running on the device in some embodiments. As another example, a host device 112 (FIG. 1) can execute an instance of process 300 for each virtual machine running on the device in some embodiments.

As illustrated, after process 300 begins, at 302, the process can connect to other hosts. These connections can be established in any suitable manner and can have any suitable characteristics. For example, these connections can be established as Transport Layer Security (TLS) connections in some embodiments.

Next, at 304, process 300 can generate a signature-verification key pair and send the verification key of the pair to the other hosts. Any suitable signature-verification key pair can be used in some embodiments. For example, in some embodiments, the signature-verification key pair can be a private-public key pair (e.g., such as an RSA key pair), wherein the signature key is a private key that is used to form a digital signature of an item using the signature key and the verification key is a public (or at least public to the other hosts) key that can be used to authenticate the digital signature of the item using the verification key.

Then, at 306, process 300 can generate and send a string to the other hosts. The string can be any suitable string, can have any suitable content, and can have any suitable length. For example, in some embodiments, the string can be binary and can have a length equal to a length needed for a key for any suitable pseudo random function (PRF) in some embodiments, and can be randomly (or pseudo-randomly) generated.

At 308, process 300 can next receive verification keys and strings from instances of process 300 running on others hosts. These verification keys and strings can be as described above in connection with 304 and 306 in some embodiments.

Next, at 310, process 300 can form a shared PRF key (SK) using the string generated at 306 and the strings received at 308. The shared PRF key can be formed using these strings in any suitable manner. For example, in some embodiments, the shared PRF key be formed by an XOR of the strings (i.e., the string generated at 306 and the strings received at 308). Because all instances of process 300 should be forming the shared PRF key from the same set of strings in the same manner, each instance should form the same shared PRF key in some embodiments.

Then, at 312, process 300 can set a round counter (RC) (i.e., a counter for counting rounds) and an expected round counter (ERC) (i.e., a counter for counting expected rounds) to zero and clear an early heartbeat (EHB) flag. The EHB flag can be used to indicate if an early heartbeat message was received as described further below.

At 314, process 300 can next determine whether the round counter is divisible by a diameter of a directed graph representing monitoring responsibilities of the hosts.

Figure 4:
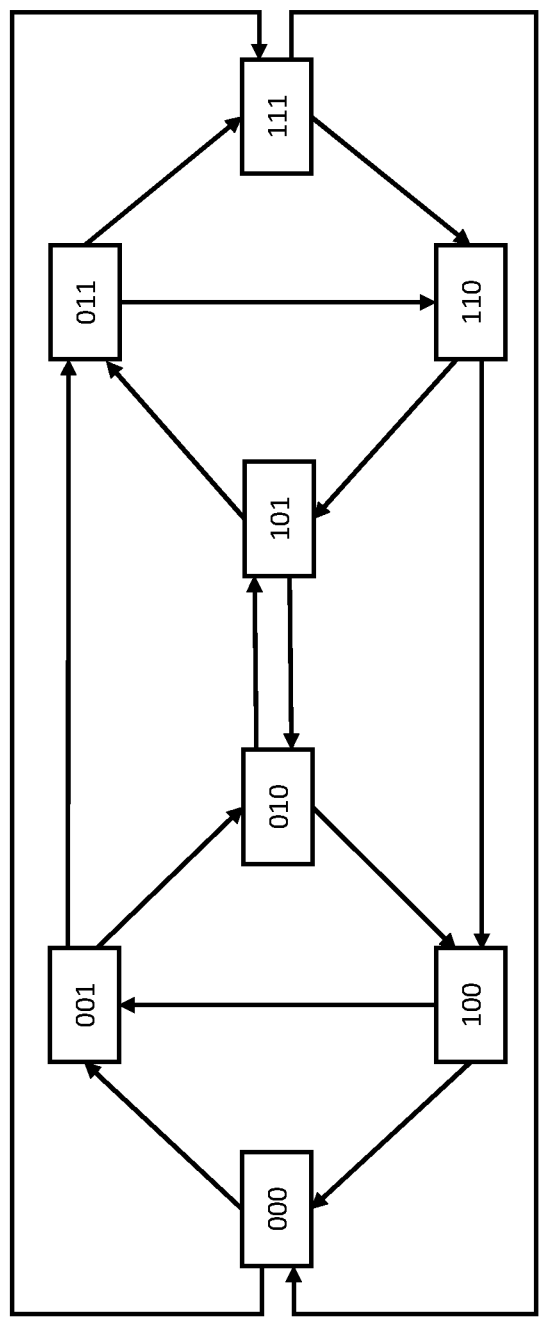
FIG. 4 is an illustration of an example of a directed graph that can be used in accordance with some embodiments.

Any suitable directed graph can be used to represent the monitoring responsibilities of the hosts in some embodiments. For example, in some embodiments, a modified De Bruijn graph or a tree graph can be used to represent the monitoring responsibilities of the hosts. An example of a modified De Bruijn graph for eight hosts is shown in FIG. 4. In a directed graph, each host can be represented by a vertex in the graph and each monitoring responsibility can be represented by an edge, where the tail of the edge is connected to the monitor (the host doing the monitoring) and the head of the edge is connected to the monitoree (the host being monitored). When the graph is implemented as a modified De Bruijn graph, the two vertices with addresses of all zeros and all ones can have edges pointing to each other rather the having edges that point to themselves as in a normal De Bruijn graph. As shown in the De Bruijn graph of FIG. 4, each vertex is identified by a three-digit binary value and each vertex monitors two vertices and is monitored by two vertices. For example, vertex 000 monitors vertices 001 and 111 and is monitored by vertices 100 and 111.

The diameter of the graph can be any suitable value in some embodiments. For example, in some embodiments, the diameter of the graph can be determined by first identifying, for each pair of vertices in the graph, the smallest number of edges connecting the vertices in the direction of the edges as the distance between the vertices, and then by identifying the distance of the pair of vertices with the largest distance as the diameter of the graph.

The round counter can be determined as being divisible by the diameter of the graph when dividing the value of the round counter by the value of the diameter results in no remainder. Because zero is divisible by any number, when the round counter has a value of zero (e.g., when 314 is performed immediately after performing 312), the determination made at 314 will be "Yes".

If it is determined at 314 that the round counter is divisible by the diameter of the graph, then, at 316, process 300 can determine, for each host, a new location of the host in the graph by evaluating the PRF using the shared PRF key (SK), the round counter (RC), and the host's identifier (e.g., a static identifier of the host). For example, the PRF may output a 000 for a first host indicating that the first host now occupies the left-most position in the graph of FIG. 4 and may output a 111 for a second host indicating that the second host now occupies the right-most position in the graph of FIG. 4. Any suitable PRF can be used in some embodiments. For example, in some embodiments, the PRF can be Advanced Encryption Standard (AES) encryption.

Because the directed graph determines which hosts are monitoring which other hosts based on the edges between vertices, being assigned a new location (i.e., a new vertex) in the graph at 316 results in each host having a new set of other hosts that it is monitoring.

Then, at 317, process can determine new monitors for the present host and determine new monitorees for the present host based on the present host's position in the directed graph. For example, referring to FIG. 4, if the present host is assigned position 000 in the graph, then it can determine that its monitors are the hosts associated with vertices 100 and 111 and that its monitorees are the hosts associated with vertices 001 and 111.

Next, at 318, process 300 can send to the host's new monitorees a rushing message indicating the value of RC.

This rushing message can be sent in any suitable manner and can have any suitable format in some embodiments.

After 318, or if it is determined at 314 that the round counter is not divisible by the diameter of the graph, then, at 320, process 300 can send a signed message to the monitors that are monitoring the host. This message can be sent in any suitable manner, can have any suitable format, and can have any suitable content in some embodiments. For example, in some embodiments, the message can indicate the current value of RC and the identity of the host.

Also, at 320, in some embodiments, process 300 can forward to the monitors any heartbeat messages received from other hosts in the previous round. These heartbeat messages can be sent in any suitable manner in some embodiments. In some embodiments, only heartbeat messages that are directly received are forwarded.

Then, at 322, process 300 can determine if the round counter (RC) is greater than or equal to the expected round counter (ERC) and whether the early heartbeat (EHB) flag is clear. If so, process 300 can sleep at 324 for any suitable duration. For example, in some embodiments, process 300 can sleep until the elapsed time since the end of the last sleep session is equal the round interval time (the sleep time is adjusted for the time spent sending and receiving messages, and performing computations).

In some embodiments, while sleeping, process 300 can be awoken in response to a message indicating that another process being monitored by the host has stopped. This other process can be any suitable process and any suitable message can be sent. For example, in some embodiments, the process can be a process started by the host and the message can be a SIGCHLD message. If it is determined that the other process has stopped, process 300 can generate an alert message in some embodiments. This alert message can be sent in any suitable manner, have any suitable format, and contain any suitable content. For example, in some embodiments, an alert message can indicate a possible attack on the other process and can be broadcast to all hosts.

After process 300 completes sleeping at 324, or if process 300 determines at 322 that the round counter (RC) is not greater than or equal to the expected round counter (ERC) or that the early heartbeat (EHB) flag is not clear, then at 330, process 300 can receive messages from the other hosts. Any suitable messages can be received in some embodiments. For example, these messages can be signed messages and forwarded heartbeat messages sent at 320 by other instances of process 300 executing on the other hosts.

Next, at 332, process 300 can determine whether an invalid message has been received. This determination can be made in any suitable manner in some embodiments. For example, if a signature on a signed message is invalid, then the signed message can be determined to be invalid in some embodiments. As another example, in some embodiments, if a round counter indicated in a signed message is less than the host's round counter, then the signed message can be determined to be invalid in some embodiments. As yet another example, if forwarded heartbeat messages have an invalid signature, have a round counter less than the host's round counter, or come from the wrong host, then the heartbeat messages can be determined to be invalid in some embodiments. Note that since the forwarding host received the heartbeat messages from the previous round, process 300 can determine the expected identities of the hosts according to the view of the graph from the previous round in some embodiments.

If it is determined at 332 that a message is invalid, then, at 334, process 300 can generate an alert message in some embodiments. This alert message can be sent in any suitable manner, have any suitable format, and contain any suitable content. For example, in some embodiments, an alert message can indicate a possible attack on the source of the message(s) and can be broadcast to all hosts.

After sending the alert at 334, or if no message is determined to be invalid at 332, at 336, process 300 can determine if there is an early heartbeat (EHB) message. This determination can be made in any suitable manner in some embodiments. For example, if process 300 receives an unexpected heartbeat message at 330, the heartbeat message can be determined to be an early heartbeat (EHB) message.

If it is determined at 336 that there is an early heartbeat message, then, at 338, process 300 can set an early heartbeat (EHB) flag at 338. This flag can be set in any suitable manner in some embodiments.

After setting the EHB flag at 338, or if it is determined that there was no early heartbeat at 336, at 340, process 300 can determine whether a rushing message with a round number that is greater than the expected round counter (ERC) has been received. If so, at 342, process 300 can set the expected round counter equal to the value of the round counter in the rushing message.

After setting the ERC at 342, or determining that no rushing message with a round number that is greater than the expected round counter (ERC) has been received, then, at 344, process 300 can determine whether a period for receiving messages has timed out. This determination can be made in any suitable manner. For example, in some embodiments, the time period for receiving messages can be the round interval plus a grace period of one second by default, or the default value multiplied by one plus the maximum outdegree of all vertices in the graph, if the round counter is divisible by the diameter.

If it is determined at 344 that the period for receiving messages has not timed out, then process can loop back to 330. Otherwise, process 300 can branch to 346 and determine whether there are any missing messages. For example, if a signed message or a heartbeat message from another instance of process 300 being executed on another host is not received, that message can be determined to be missing.

If process 300 determines at 346 that a message is missing, the process can generate an alert message at 348 in some embodiments. This alert message can be sent in any suitable manner, have any suitable format, and contain any suitable content. For example, in some embodiments, an alert message can indicate a possible attack on the source of the message(s) and can be broadcast to all hosts.

After sending an alert message at 348, or if it is determined at 346 that no message is missing, then process 300 can increment the round counter at 350 and loop back to 314.

It should be noted that the above steps of the process of FIG. 3 can be executed or performed in any order or sequence not limited to the order and sequence shown and described in FIG. 3. Also, some of the above steps of the process of FIG. 3 can be executed or performed substantially simultaneously where appropriate or in parallel to reduce latency and processing times. Furthermore, it should be noted that the process of FIG. 3 is provided as an example only. At least some of the steps shown in this figure may be performed in a different order than represented, performed concurrently, or altogether omitted.

In some embodiments, any suitable computer readable media can be used for storing instructions for performing the processes described herein. For example, in some embodiments, computer readable media can be transitory or non-transitory. For example, non-transitory computer readable media can include non-transitory media such as non-transitory magnetic media (such as hard disks, floppy disks, and/or any other suitable media), non-transitory optical media (such as compact discs, digital video discs, Blu-ray discs, and/or any other suitable optical media), non-transitory semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative embodiments, the present disclosure has been made only by way of example, and numerous changes in the details of implementation of the disclosed subject matter can be made without departing from the spirit and scope of the disclosed subject matter, which is limited only by the claims that follow. Features of the disclosed embodiments can be combined and rearranged in various ways.

What is claimed is:

1. A system for defending a computing system from attack, comprising:
   a memory; and
   a hardware processor coupled to the memory and configured to execute a local host that is configured to:
      maintain a round counter that tracks a round number;
      determine whether the round counter is divisible by a diameter of a graph identifying each of a plurality of hosts including the local host;
      in response to determining that the round counter is divisible by the diameter of the graph, determine a location in the graph for each of the plurality of hosts including the local host;
      determine a monitor host of the plurality of hosts that is monitoring the local host;
      determine a monitoree host of the plurality of hosts that is monitored by the local host;
      send a message to the monitor host identifying a value of the round counter;
      forward a first set of heartbeat messages previously sent from the monitoree host to the monitor host;
      attempt to receive a message from the monitoree host;
      determine whether a message was not received from the monitoree host; and
      in response to determining that a message was not received from the monitoree host, generate an alert.

2. The system of claim 1, wherein the directed graph is a DeBruijn graph.

3. The system of claim 1, wherein the location in the graph for each of a plurality of hosts is determined using a pseudo-random function.

4. The system of claim 3, wherein the location in the graph for each of a plurality of hosts is determined using the pseudo-random function based on a shared key, the round counter, and an identifier for each of the plurality of hosts.

5. The system of claim 1, wherein the message sent to the monitor host identifying a value of the round counter is signed.

6. The system of claim 1, wherein the hardware processor is configured to generate an alert in response to determining whether any received messages are invalid.

7. The system of claim 1, wherein the hardware processor is configured to determine whether any heartbeat messages were received early.

8. A method for defending a computing system from attack, comprising:
   maintaining a round counter that tracks a round number for a local host using a hardware processor;
   determining whether the round counter is divisible by a diameter of a graph identifying each of a plurality of hosts including the local host;
   in response to determining that the round counter is divisible by the diameter of the graph, determining a location in the graph for each of the plurality of hosts including the local host using the hardware processor;
   determining a monitor host of the plurality of hosts that is monitoring the local host using the hardware processor;
   determining a monitoree host of the plurality of hosts that is monitored by the local host using the hardware processor;
   sending a message to the monitor host identifying a value of the round counter using the hardware processor;
   forwarding a first set of heartbeat messages from the monitoree host to the monitor host using the hardware processor;
   attempting to receive a message from the monitoree host using the hardware processor;
   determining whether a message was not received from the monitoree host using the hardware processor; and
   in response to determining that a message was not received from the monitoree host, generating an alert using the hardware processor.

9. The method of claim 8, wherein the directed graph is a DeBruijn graph.

10. The method of claim 8, wherein the location in the graph for each of a plurality of hosts is determined using a pseudo-random function.

11. The method of claim 10, wherein the location in the graph for each of a plurality of hosts is determined using the pseudo-random function based on a shared key, the round counter, and an identifier for each of the plurality of hosts.

12. The method of claim 8, wherein the message sent to the monitor host identifying a value of the round counter is signed.

13. The method of claim 8, further comprising generating an alert in response to determining whether any received messages are invalid.

14. The method of claim 8, further comprising determining whether any heartbeat messages were received early.

15. A non-transitory computer-readable medium containing computer-executable instructions that, when executed by a processor, cause the processor to perform a method for defending a computing system from attack, the method comprising:
   maintaining a round counter that tracks a round number for a local host;
   determining whether the round counter is divisible by a diameter of a graph identifying each of a plurality of hosts including the local host;

in response to determining that the round counter is divisible by the diameter of the graph, determining a location in the graph for each of the plurality of hosts including the local host;

determining a monitor host of the plurality of hosts that is monitoring the local host;

determining a monitoree host of the plurality of hosts that is monitored by the local host;

sending a message to the monitor host identifying a value of the round counter;

forwarding a first set of heartbeat messages from the monitoree host to the monitor host;

attempting to receive a message from the monitoree host;

determining whether a message was not received from the monitoree host; and in response to determining that a message was not received from the monitoree host, generating an alert.

16. The non-transitory computer-readable medium of claim 15, wherein the directed graph is a DeBruijn graph.

17. The non-transitory computer-readable medium of claim 15, wherein the location in the graph for each of a plurality of hosts is determined using a pseudo-random function.

18. The non-transitory computer-readable medium of claim 17, wherein the location in the graph for each of a plurality of hosts is determined using the pseudo-random function based on a shared key, the round counter, and an identifier for each of the plurality of hosts.

19. The non-transitory computer-readable medium of claim 15, wherein the message sent to the monitor host identifying a value of the round counter is signed.

20. The non-transitory computer-readable medium of claim 15, wherein the method further comprises generating an alert in response to determining whether any received messages are invalid.

* * * * *